April 19, 1932.  W. HUCAL  1,854,840
ADDING MACHINE
Filed Oct. 14, 1929   2 Sheets-Sheet 1
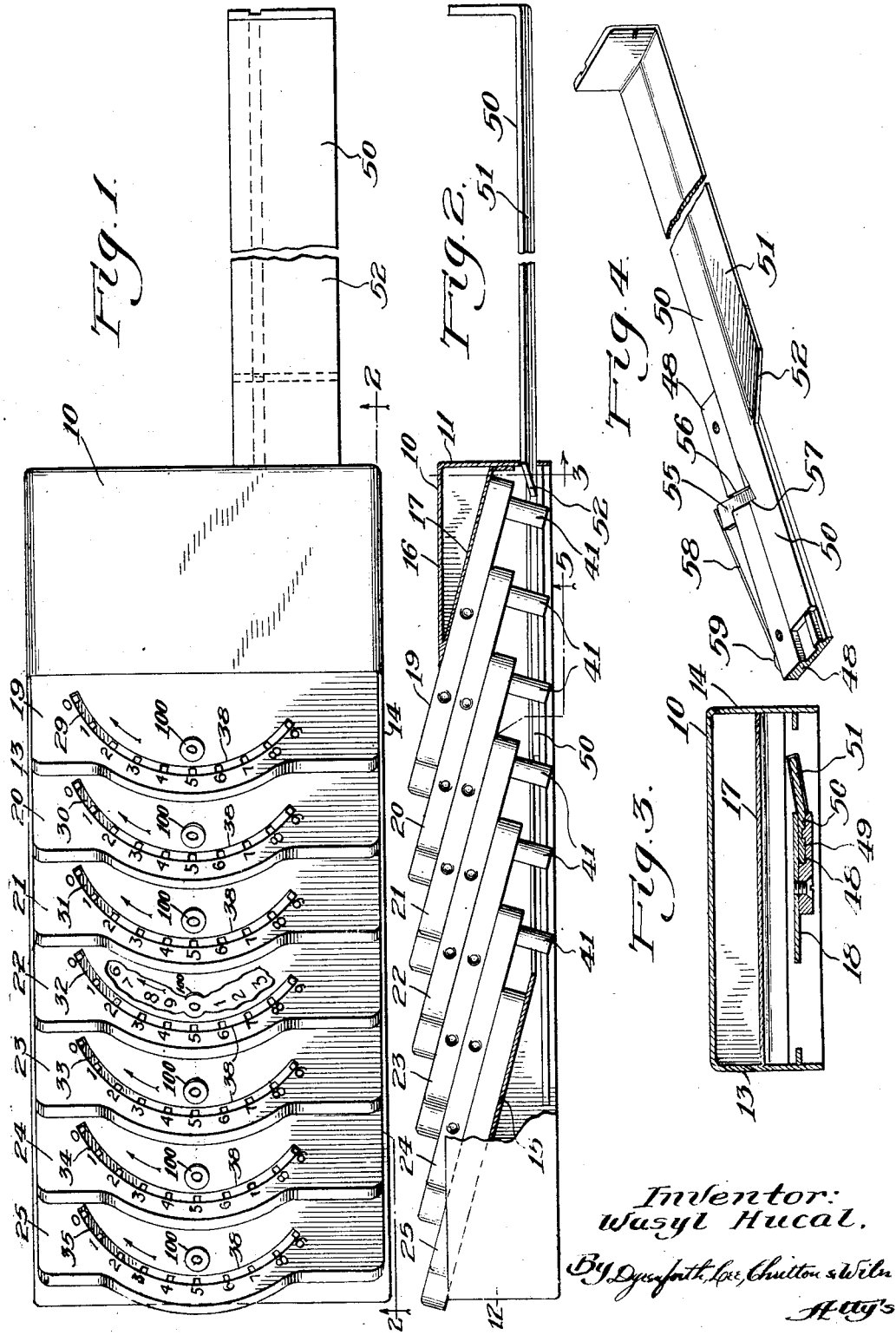
Inventor:
Wasyl Hucal.

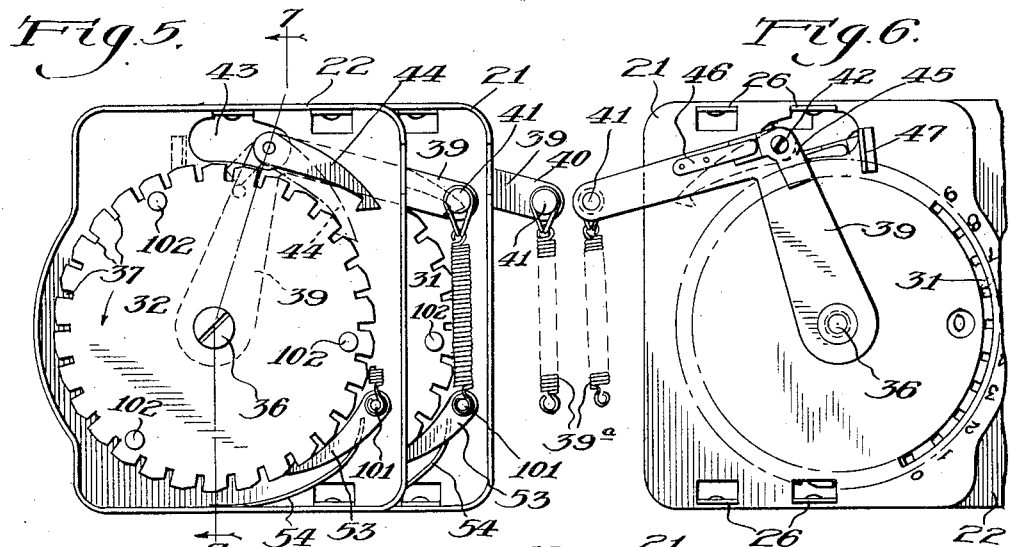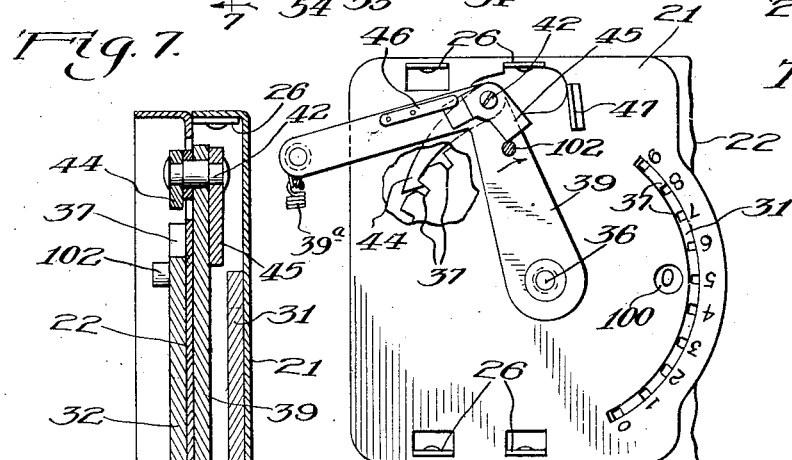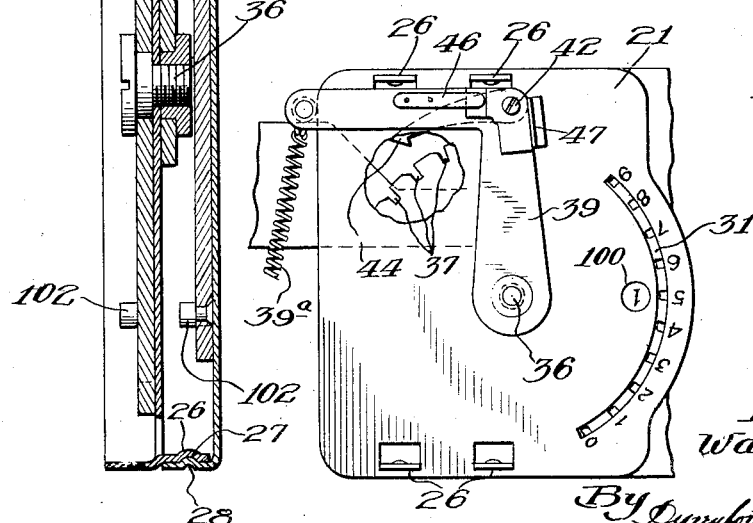

Patented Apr. 19, 1932

1,854,840

UNITED STATES PATENT OFFICE

WASYL HUCAL, OF CHICAGO, ILLINOIS

ADDING MACHINE

Application filed October 14, 1929. Serial No. 399,600.

My primary object is to provide a novel, simple and economical construction of adding machine which shall be very compact and require the exertion of relatively slight force only to operate the machine to make the calculation.

Referring to the accompanying drawings:

Figure 1 is a face view of my improved adding machine.

Figure 2 is a section taken at the irregular line 2—2 on Fig. 1 and viewed in the direction of the arrows.

Figure 3 is a section taken at the line 3 on Fig. 2 and viewed in the direction of the arrow.

Figure 4 is a perspective view of a slide, with a portion thereof intermediate its ends broken away, forming a part of the mechanism, this view also showing, in perspective, a portion of the adjacent casing of the device together with a stop pawl cooperating with the slide.

Figure 5 is a bottom plan view of two of the ratchet-equipped casings forming elements of the device, this view being taken at the irregular line 5 on Fig. 2 and viewed in the direction of the arrow.

Figure 6 is a face view of the structure shown in Fig. 5.

Figure 7 is an enlarged section taken at the line 7—7 on Fig. 5 and viewed in the direction of the arrows; and Figures 8 and 9 are views of the structure shown in Fig. 6, representing the mechanism therein in different successive positions occupied by them in the course of making a calculation.

The device shown comprises a skeleton casing 10, formed of end walls 11 and 12, side walls 13 and 14, an inclined plate section 15 at one end of the casing, a top platelike section 16 at the other end of the casing, an inclined plate section 17 below the top section 16 and extending substantially parallel with the plate section 15, and a narrow strip section 18 located midway between the side walls 13 and 14 and connected at its opposite ends with the lower ends of the plate sections 15 and 17.

The device also comprises a plurality of casings, represented at 19, 20, 21, 22, 23, 24 and 25, grouped together in such a position that adjacent ones of these casings are only partially mutually overlapped, the structure thus presented being of step form, as shown. Each of the casings 19-25 is open at its under side, these casings being releasably connected together in the grouped relation shown and above described, by means of upwardly extending lugs 26 on opposed edges of these casings except the uppermost one, these lugs being inset from said edges of the casings and containing outwardly opening sockets 27 to receive upwardly extending projections 28 provided on the adjacent ones of the casings, the springiness of the metal of the casings holding these parts releasably connected together.

The casings 19-25 thus grouped together are insertable into, and removable from, the casing 10 as a unit.

The casings 19-25 contain ratchet disks 29, 30, 31, 32, 33, 34 and 35 each of the same form and journalled below the top walls of the casings on pivot devices, as represented at 36 of the ratchets shown in Figs. 5-9.

Each of the ratchets referred to, according to the particular illustrated embodiment of the invention, has thirty teeth, the slots between which, represented at 37, registering, at their ends, with arcuate slots 38 in the tops of the casings 19-25, each casing being provided with an arcuate series of digits adjacent an edge of the slot 38 and in radial registration with slots 37 of the adjacent ratchet disks. Each ratchet disk is provided on its upper face with three sets of digits (each from 0 to 9, inclusive,) disposed in a circular arrangement and in radial alinement, respectively, with the slots 37 in these disks and singly exposed to view through an opening 100 in its associated casing.

Journalled on the upper end of each stud 36, except the stud on casing 19, is a bellcrank lever 39, the arms 40 of these bellcranks having depending studs 41. The studs 41, assuming all of the levers 39 to be in the same position, extend in alinement, longitudinally of the machine, in the opening along one side of the bottom of the casing 10, as shown in Fig. 2. Each lever 39 has connected therewith a coil spring 39ᵃ shown as secured to a stud 101 on the next adjacent one of the casings 19–25 above it, the springs 39ᵃ yieldingly holding the lever 39 in the position shown in Figs. 5, 6 and 8.

Each lever 39 is provided with a pin 42 journalled therein at the angle of the lever and extending through a slot in the one of the casings to which the lever is pivoted, each pin 42 at its lower end having rigid thereon a dog 44 disposed below the top of the casing and adapted to cooperate with the teeth on the adjacent ratchet disk.

The upper ends of the pins 42 have rigid thereon bell-crank levers 45 frictionally engaged by leaf springs 46 secured to the levers 39. The dog 44, pin 42, and lever 45 of each assembly are thus rigidly connected together and are rotatable as a unit on the supporting bell-crank.

It may be here stated that the purpose of the lever 39, dog 44, and lever 45 of each assembly is to act as a carry mechanism, that is to produce the stepping up of the ratchets controlled thereby to effect the making of the calculation. When one of the levers 45 is rocked out of normal position (Fig. 6) into the position shown in Fig. 8 it swings the dog 44 secured thereto into the position shown in Fig. 8 and thus into the opposing one of the notches 37 in the ratchet with which it cooperates so that when the lever 39 carrying this dog and the lever 45 connected therewith, is swung, as hereinafter described in clockwise direction in Fig. 8 against the action of the coil spring 39ᵃ, it advances said ratchet a distance equal to the distance between two adjacent teeth thereof.

Extending into the path of movement of each lever 45, assuming the lever to have been swung on the supporting lever 39 to the position shown in Fig. 8 and when the lever 39 is swung from the position shown in Fig. 8 to the position shown in Fig. 9, is a stop 47 on the casing associated with this lever which, following the rotation of the ratchet by the dog 44, as stated, operates to swing the lever 45 on the lever 39 which carries it, to a position in which the dog 44 is withdrawn from engagement with the ratchet (Fig. 9).

The swinging of the levers 45 to engage the dogs 44 connected therewith, with the ratchets as stated, is effected by pins 102 on each of the ratchets, except the lowermost one thereof, namely, the one at the extreme left-hand side of Fig. 2. Three of these pins, equidistantly spaced, are provided on each of the ratchets referred to and they are so disposed that when any one of the ratchets, except the lowermost one, is rotated from a position in which its "0" registers with the opening 100 in its associated casing to a position in which its next adjacent "9" marking registers with this opening the lever 45 will be actuated as stated.

The mechanism for actuating the levers 39 for the purpose above stated, comprises the following construction:

The strip portion 18 of the casing 10 is provided with a bar 48 secured flatwise to the underside thereof and recessed at 49 along its upper surface to form, with the strip portion 18, a guide in which a slide 50 is reciprocable. The slide 50 is provided at its outer end with a widened portion 51 at which it extends laterally beyond the strip portion 18 and the bar 48, the portion 51 being slightly upwardly inclined transversely thereof and its inner end portion being beveled as represented at 52 to form a cam. The cam portion 52 of the slide cooperates with the pins 41 on the levers 39, these pins when the slide 50 is drawn out to the position shown in Figs. 1 and 2, extending into the path of movement of the cam surface 52 of the slide 50 when the slide is pushed inwardly, the slide 50 upon being so actuated engaging the pins 41 in succession and swinging the levers 39 associated therewith to the position shown of the one illustrated in Fig. 9 in opposition to the springs 39ᵃ, with the result above explained.

The operation of the mechanism is as follows:

Assuming, by way of example, that it is desired that the addition of 1 to 999,999 be calculated on the machine, each of the ratchets 29 to 34, inclusive, will be rotated in clockwise direction in Fig. 1 to expose one of the numerals 9 on each thereof at the sight openings 100 in the casings with which they are associated, and the ratchet 35 will be rotated to expose its "0" marking. Either before or after the setting up of the ratchets as stated, the operator withdraws the slide 50 to a position in which its widened portion 51 is out of engagement with the pins 41, as shown in Fig. 2. The operator then rotates ratchet 29 in clockwise direction a distance equal to the distance between two adjacent teeth thereof, namely, to bring the "0" marking on this ratchet into registration with the sight opening 100 in the casing 20. To complete the making of the calculation the operator pushes the slide 50 into the casing to engage at its cam surface 52 with all of the pins 41 in succession, whereupon each of the disks 30 to 34, inclusive, will be rotated in clockwise direction in Fig. 1 a distance between two adjacent teeth to bring the "0" markings thereon next to the "9" markings previously exposed, into registration with the sight opening 100, and the ratchet 35 will be rotated in clockwise direction to bring the numeral "1" thereof next to the "0" marking originally exposed through the opening 100, into registration with this opening thus indicating the calculation, namely, 1,000,000.

In explanation of the rotation of the several ratchets, as above stated, to indicate the calculation, it may be stated that the slide 50 in being moved inwardly first engages, at its cam 52, with the pin 41 carried by the lever 39 associated with the casing 20. As the bell-crank 45 on the lever just referred to was rotated to the position shown in Fig. 8 by the engagement therewith of one of the pins 102 on the ratchet 29 in the manual rotation of this ratchet from the "9" to the "0" marking, the actuation of this lever 39 by the slide 50 as stated causes the ratchet 30 to be moved one step to expose the "0" marking. The ratchet 30 in moving from "9" to "0" as stated causes the bell-crank 45 on the lever 39 associated with the casing 21 to move to the position shown in Fig. 8, the slide 50 in moving inwardly into engagement with the pin 41 on the lever 39 associated with the casing 21 thereby rocking this lever 39 causes the ratchet 31 to be moved one step to expose the "0". The successive actuations of the ratchets 32, 33, and 34 from a position in which the "9" markings are exposed, to a position in which the "0" markings are exposed, is effected by the continued inward movement of the slide 50 engaging the pins 41 of the levers associated with these ratchets, the conditioning of the lever mechanisms 45 cooperating therewith for stepping up these ratchets being effected by the step rotation of the next ratchet in advance thereof as above explained in connection with the movement of the ratchets 30 and 31.

As the ratchet 35 was positioned with its "0" marking exposed to view, before pushing the slide 50 inwardly, the rotation of the ratchet 34 in the operation of making the calculation from a position in which the "9" marking is exposed to a position in which the next "0" marking is exposed caused one of the pins 102 on ratchet 34 to rotate the bell-crank 45 on the lever 39 associated with the ratchet 35 to the position shown in Fig. 8, so that when the slide 50 continued its inward movement and engaged the pin 41 of this lever 39 the ratchet 35 was rotated one step to expose the "1" marking.

The feature of inclining the portion 51 presenting the cam 52 is to compensate for the receding movement of the pins 41 upwardly from the bottom of the casing as the levers 39 swing outwardly when moved by the slide 50 and thereby prevent the slide 50 from disengaging from the pins 41.

A machine constructed in accordance with my invention is not only of simple and economical construction, but by reason of the incorporation therein of the principle of operation involving the operation of the levers 39 in succession, requires the exertion of relatively slight force only by the operator to actuate the machine for making the calculation.

In practical use of the device, for facility and certainty of operation, it is desirable to push the element 50 as far as it can be moved but such operation is not essential as complete operation will be secured if it be pushed only so far as to actuate pin 41 next beyond the ratchet 32 of the highest value last actuated in setting up a number to be added.

In order that retrograde movement of the various ratchets, namely, rotation in counterclockwise direction in Fig. 1, be prevented, each ratchet has associated therewith a dog 53, these dogs being pivoted on the studs 101, respectively, and yieldingly pressed into engagement with the peripheries of the respective ratchets by springs 54.

To avoid accidental withdrawal of the slide 50 beyond the position shown in Fig. 2 the machine is provided with a dog 55 slidable in a recess 56 in the bar 48 and yieldingly pressed inwardly for engagement with a shoulder 57 on the slide 50 by a spring 58 secured at 59 to the bar 48.

While I have illustrated and described a particular construction embodying my invention, I do not wish to be understood as intending to limit it thereto as the same may be variously modified and altered without departing from the spirit thereof.

What I claim as new, and desire to secure by Letters Patent is:

1. A device of the character described, comprising a plurality of rotatably supported disks one of which is provided with a ratchet, a movably supported element associated with said ratchet-equipped disk, a pawl actuated by said element, and means on the other of said disks for directly engaging and moving said pawl into a position in which it actuates said ratchet when said element is actuated.

2. A device of the character described, comprising a plurality of rotatably supported disks one of which is provided with a ratchet, a pivotally supported lever associated with said ratchet-equipped disk, a pawl actuated by said lever, and means on the other of said disks for directly engaging and moving said pawl into a position in which it actuates said ratchet when said lever is actuated.

3. A device of the character described, comprising a plurality of rotatably supported disks one of which is provided with a ratchet, a movably supported element associated with said ratchet-equipped disk, means yieldingly holding said element in a normal position, a pawl actuated by said element, and means on the other of said disks for directly engaging and moving said pawl into a position in which it actuates said ratchet when said element is actuated out of normal position.

4. A device of the character described, comprising a plurality of rotatably supported disks one of which is provided with a ratchet, a pivotally supported lever associated with said ratchet-equipped disk, a pawl pivoted on said lever and bodily movable by the latter, and means on the other of said disks for directly engaging and rotating said pawl into a position in which it actuates said ratchet when said lever is actuated.

5. A device of the character described comprising a plurality of rotatably supported disks one of which is provided with a ratchet, a movably supported element associated with said ratchet-equipped disk, a pawl actuated by said element, means on the other of said disks for directly engaging and moving said pawl into a position in which it actuates said ratchet when said element is actuated, and stationary means engaged by said pawl operating upon the conclusion of the movement of said lever to move said pawl out of rachet engaging position.

6. A device of the character described, comprising a plurality of rotatably supported disks one of which is provided with a ratchet, a pivotally supported lever associated with said ratchet-equipped disk, a pawl actuated by said lever, means on the other of said disks for directly engaging and moving said pawl into a position in which it actuates said ratchet when said lever is actuated, and stationary means engaged by said pawl operating upon the conclusion of the movement of said lever to move said pawl out of ratchet engaging position.

7. A device of the character described, comprising a plurality of rotatably supported disks one of which is provided with a ratchet, a pivotally supported lever associated with said ratchet-equipped disk, a pawl pivoted on said lever and bodily movable by the latter, means on the other of said disks for directly engaging and rotating said pawl into a position in which it actuates said ratchet when said lever is actuated, and stationary means engaged by said pawl operating upon the conclusion of the movement of said lever to move said pawl out of ratchet engaging position.

8. A device of the character described, comprising a plurality of rotatably supported disks, a casing section for one of said disks, said last-referred-to disk being provided with a ratchet, a pawl, an element for actuating said pawl movably supported on said casing, and means on the other of said disks for directly engaging and moving said pawl into a position in which it actuates said ratchet when said element is actuated.

9. A device of the character described, comprising a plurality of rotatably supported disks, a casing section for one of said disks, said last-referred-to disk being provided with a ratchet, a lever pivotally supported on said casing, a pawl actuated by said lever, and means on the other of said disks for directly engaging and moving said pawl into a position in which it actuates said ratchet when said lever is actuated.

10. A device of the character described, comprising a plurality of rotatably supported disks, a casing section for one of said disks, said last-referred-to disk being provided with a ratchet, a pawl, an element for actuating said pawl movably supported on said casing, means on the other of said disks for moving said pawl into a position in which it actuates said ratchet when said element is actuated, and rigid means on said casing operating upon the conclusion of the movement of said element to move said pawl out of ratchet engaging position.

11. A device of the character described comprising a plurality of rotatably supported disks one of which is provided with a ratchet, a movably supported element associated with said ratchet equipped disk, a pawl pivoted on said element and bodily movable by the latter, friction means resisting rotation of said pawl on said element, and means on the other of said disks for directly engaging and rotating said pawl into a position in which it actuates said ratchet when said element is actuated.

12. A device of the character described comprising a plurality of rotatably supported disks one of which is provided with a ratchet, a movably supported element associated with said ratchet equipped disk, a pawl pivoted on said element and bodily movable by the latter, friction means resisting rotation of said pawl on said element, means on the other of said disks for rotating said pawl into a position in which it actuates said ratchet when said element is actuated, and rigid means to be engaged by said pawl operating upon the conclusion of the movement of said element to rotate said pawl out of ratchet engaging position.

13. A device of the character described comprising three or more rotatably supported disks and means for rotating certain of said disks comprising movable elements and a slide for actuating said elements in succession.

14. A device of the character described comprising a main casing, a plurality of casings disposed in partially overlapped relation and located in said main casing, calculating mechanism comprising disks on said second-named casings, movable elements for actuating said disks and a member supported, and movable, on said main casing and operating, when actuated, to move said movable elements in succession.

15. In a device of the character described, in combination, a plurality of like elements one for each series of ordinals above units, each element comprising a rotary ratchet equipped disk, a pivoted lever associated therewith, a pawl pivoted on said lever, a member projecting from said pawl, carrying means projecting from said disk to directly engage the projecting member of the disk of the next higher order to throw the pawl thereof into engagement with the ratchet of its disk, stationary means to be engaged by said member at the limit of movement of said lever to throw said pawl out of engagement with said ratchet, means to engage all of said levers to actuate the same and the pawls carried thereby, and means to return the levers to normal position.

16. In a device of the character described, in combination, a plurality of like elements one for each series of ordinals above units, each element comprising a frame plate, a ratchet equipped ordinal marked disk pivoted on said plate to be actuated by a stylus, a carrying lever pivoted on said plate, a carrying pawl pivoted on said lever, a member projecting from the pivot of said pawl forming a bell crank therewith, a carrying member movable with said disk to contact the projecting member of the pawl of the next higher ordinal disk and move said pawl into engagement with said ratchet, a rigid abutment carried by said plate to be engaged by said projecting member to limit the movement of said lever and to remove its pawl from said ratchet, a detent pawl pivoted on said plate spring pressed into engagement with the ratchet of said disk, and common means to actuate each of said levers.

17. In a device of the character described, a plurality of like elements each comprising a plate formed with flanges projecting from its edges in one direction, bosses, carried by said flanges, lips projecting from the face of said plate adjacent its opposite edges, offset from the planes of said flanges, and each formed with depressions to engage the bosses upon an adjacent element whereby to hold said elements in assembled relation, like calculating mechanisms assembled on said elements including carrying means projecting from each element, a casing to receive the assembled elements and a movable element mounted on the casing to contact each of said carrying means to actuate the same for carrying operation.

WASYL HUCAL.